(12) United States Patent
Kotla et al.

(10) Patent No.: US 9,418,215 B2
(45) Date of Patent: Aug. 16, 2016

(54) OPTICAL SECURITY ENHANCEMENT DEVICE

(71) Applicant: Microsoft Technology Licensing, LLC, Redmond, WA (US)

(72) Inventors: Ramakrishna Kotla, Sunnyvale, CA (US); Andreas Georg Nowatzyk, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/874,311

(22) Filed: Apr. 30, 2013

(65) Prior Publication Data

US 2014/0325677 A1    Oct. 30, 2014

(51) Int. Cl.
   G06F 17/30    (2006.01)
   G06F 21/36    (2013.01)
   G06F 21/62    (2013.01)
   G06F 21/84    (2013.01)

(52) U.S. Cl.
   CPC ............ *G06F 21/36* (2013.01); *G06F 21/6218* (2013.01); *G06F 21/84* (2013.01)

(58) Field of Classification Search
   CPC ..... G06F 21/10; G06F 21/31; G06F 21/6218; G06F 2221/2141; H04L 63/102
   USPC .......................................................... 726/28
   See application file for complete search history.

(56) References Cited

U.S. PATENT DOCUMENTS

| 5,748,895 | A | 5/1998 | Shiff et al. |
| 6,529,209 | B1 | 3/2003 | Dunn et al. |
| 7,253,791 | B2 | 8/2007 | Kahan et al. |
| 7,659,869 | B1 | 2/2010 | Bauchot et al. |
| 2001/0026248 | A1 | 10/2001 | Goren et al. |
| 2002/0101988 | A1* | 8/2002 | Jones ............................. 380/54 |
| 2003/0108198 | A1 | 6/2003 | Lahiri |
| 2005/0044395 | A1 | 2/2005 | Staring et al. |
| 2005/0117748 | A1 | 6/2005 | Schrijen et al. |
| 2005/0140572 | A1* | 6/2005 | Kahan et al. ...................... 345/7 |
| 2005/0219149 | A1 | 10/2005 | Tuyls et al. |
| 2005/0225720 | A1 | 10/2005 | Ridings |

(Continued)

FOREIGN PATENT DOCUMENTS

| WO | WO03/067797 | 8/2003 |
| WO | 2011104166 A1 | 9/2011 |

OTHER PUBLICATIONS

"A History of U.S. Communications Security (vols. I and II); the David G. Boak Lectures, National Security Agency, 1973", governmentattic.org, Dec. 24, 2008, 158 pages.

(Continued)

*Primary Examiner* — Baotran N To
(74) *Attorney, Agent, or Firm* — Sandy Swain; Micky Minhas; Lee & Hayes, pllc.

(57) ABSTRACT

An optical security device can be used to view sensitive information provided in an obscured format via a potentially untrusted and/or compromised computer. The techniques described herein enable use of untrusted computers for access to sensitive information. The optical security device employs one or more forms of visual cryptography such as spatial cryptography and/or temporal cryptography in some instances via a programmable mask and/or a programmable color filter to reveal sensitive information that is provided in an obscured form by a potentially untrusted computer.

20 Claims, 10 Drawing Sheets

(3 of 10 Drawing Sheet(s) Filed in Color)

(56) References Cited

U.S. PATENT DOCUMENTS

| | | | |
|---|---|---|---|
| 2005/0235217 A1 | 10/2005 | Hoe-Richardson | |
| 2005/0254113 A1* | 11/2005 | Cirkel et al. | 359/259 |
| 2006/0008086 A1 | 1/2006 | Kevenaar et al. | |
| 2006/0020559 A1* | 1/2006 | Steinmetz | 705/67 |
| 2006/0115082 A1 | 6/2006 | Kevenaar et al. | |
| 2006/0177060 A1 | 8/2006 | Johnson et al. | |
| 2006/0179407 A1 | 8/2006 | Tuyls et al. | |
| 2006/0227969 A1 | 10/2006 | Johnson et al. | |
| 2007/0005967 A1 | 1/2007 | Mister et al. | |
| 2007/0057886 A1 | 3/2007 | Johnson et al. | |
| 2007/0118482 A1 | 5/2007 | Tuyls et al. | |
| 2007/0133839 A1 | 6/2007 | Muller et al. | |
| 2007/0200927 A1 | 8/2007 | Krenik | |
| 2008/0005035 A1 | 1/2008 | Schwartz et al. | |
| 2008/0239195 A1 | 10/2008 | Nishio et al. | |
| 2009/0067627 A1 | 3/2009 | Hogl | |
| 2009/0213132 A1* | 8/2009 | Kargman | 345/581 |
| 2010/0024004 A1* | 1/2010 | Boegelund et al. | 726/3 |
| 2010/0138912 A1 | 6/2010 | Bauchot et al. | |
| 2010/0271396 A1 | 10/2010 | Nemeth et al. | |
| 2011/0298894 A1 | 12/2011 | Jarvenpaa | |
| 2012/0132705 A1* | 5/2012 | Goluke et al. | 235/379 |
| 2012/0133850 A1 | 5/2012 | Broen et al. | |
| 2012/0204229 A1 | 8/2012 | Bauchot et al. | |
| 2012/0204230 A1 | 8/2012 | Bauchot et al. | |
| 2013/0163818 A1 | 6/2013 | Rosset et al. | |
| 2013/0188127 A1 | 7/2013 | Cabeza Guillen et al. | |

OTHER PUBLICATIONS

Atkinson, "TEMPEST 101", retrieved on Mar. 11, 2013, at <<http://www.tscm.com/TSCM101tempest.html>>, Granite Island Group, 21 pages.

Barker, "Guideline for Identifying an Information System as a National Security System", NIST Special Publication 800-59, NIST, U.S. Dept. of Commerce, Aug. 2003, 21 pages.

Certified TEMPEST and Rugged systems, retreived on Mar. 11, 2013, at <<http://eurotempest.net/>>, Eurotempest, Jan. 15, 2013, 5 pages.

"Electromagnetic Eavesdropping Machines for Christmas?", Computers and Security, vol. 7, No. 4, no publication date, 4 pages.

"RAS-515A Raster Analysis System", retrieved on Mar. 11, 2013, at <<http://www.martykaiser.com/ras515a.htm>>, Martin L. Kaiser Inc., no publication date, 2 pages.

Kuhn, "Compromising emanations: eavesdropping risks of computer displays", University of Cambridge, Computer Laboratory, Technical Reports, No. 577, Dec. 2003, 167 pages.

Kuhn, "Electromagnetic Eavesdropping Risks of Flat-Panel Displays", Presented at 4th Workshop on Privacy Enhancing Technologies, May 26-28, 2004, Toronto, Canada, pp. 1-20.

Kuhn, et al., "Soft Tempest: Hidden Data Transmission Using Electromagnetic Emanations", Springer-Verlag Berlin Heidelberg, Information Hiding 1998, LNCS 1525, 1998, pp. 124-142.

Loughry, et al., "Information Leakage from Optical Emanations", ACM Transactions on Information and System Security, vol. 5, No. 3, Aug. 2002, pp. 262-289.

"NACSIM 5000 Tempest Fundamentals", National Security Agency, Dec. 31, 2000, 34 pages.

TEMPEST Inc., retrieved on Mar. 11, 2013 at <<http://www.tempest-inc.com/home.htm>>, TEMPEST Inc., 2012.

"TEMPEST Standards", retrieved on Mar. 11, 2013, at <<http://www.sst.ws/tempest_standards.php>>, Secure Systems and Technologies, no publication date, 2 pages.

"TEMPEST: a Signal Problem", NSA, Sep. 27, 2007, pp. 26-30.

"The Complete, Unofficial TEMPEST Information Page", Dec. 17, 1996, 58 pages.

Thiele, "Tempest for Eliza", retrieved on Mar. 11, 2013, at <<http://www.erikyyy.de/tempest/>>, 2001, 6 pages.

Vuagnoux, et al., "Compromising Electromagnetic Emanations of Wired and Wireless Keyboards", retrieved on Mar. 11, 2013, at <<http://lasecwww.epfl.ch/keyboard/>>, published in 18th USENIX Security Symposium 2009, 3 pages.

Young, "How Old Is TEMPEST", retrieved on Mar. 11, 2013, at <<http://cryptome.org/tempest-old.htm>>, Feb. 2000, 9 pages.

Office action for U.S. Appl. No. 13/874,385, mailed on Sep. 12, 2014, Kotla et al., "Optical Security Enhancement Device", 21 pages.

PCT Search Report dated Jul. 24, 2014 for PCT/US2014/035772, 8 pages.

The PCT 2nd Written Opinion for PCT application No. PCT/US2014/035772, 5 pages.

"Final Office Action Issued in U.S. Appl. No. 13/874,385", Mailed Date: Jun. 3, 2015, 25 Pages.

"International Preliminary Report on Patentability Issued in PCT Application No. PCT/US2014/035772", Mailed Date: Jul. 7, 2015, 6 Pages.

Office action for U.S. Appl. No. 13/874,385, mailed on Dec. 17, 2015, Kolta et al., "Optical Security Enhancement Device," 21 pages.

* cited by examiner

OPTICAL SECURITY ENHANCEMENT DEVICE

BACKGROUND

Conventionally, sensitive transactions can be compromised by an adversary manipulating hardware and/or software, by an adversary intercepting a user's physical mail, by an adversary observing user entry, by an adversary employing key-stroke loggers, by an adversary intercepting mouse, touch-screen, or gestural input events, and/or by an adversary scavenging the content of the memory in the graphics subsystem. Examples of such sensitive transactions include authentication dialogs for online commerce that require a user to enter passwords, account numbers, or other private information.

Typical existing solutions involve the use of a physical or a digital one-time pad and are expensive and inconvenient. In a physical example, a financial institution mails a customer a list of random numbers, each of which can be used for only one transaction, but the list can be intercepted from the mail, and when the user account information is obtained, the attacker can have unbridled access to the user's account. In a digital example, a trusted, auxiliary device becomes part of a session-unique challenge/response dialog. In the digital example, the user is required to enter a password into a secure, self-contained device, which then supplies a unique key that the user has to enter as part of the authentication dialog.

Another existing solution involves the use of a biometric sensor, such as a fingerprint reader, a retina scan, etc. The appropriate scanner is incorporated into terminal devices or add-on devices, which are susceptible to hardware attacks. It has been shown that fingerprint readers can be fooled making a replica that works with multiple commercial fingerprint readers. Regardless of the technical strength of biometric sensors, they are expensive to incorporate into a wide-spread service with a large, heterogeneous user group. They are also difficult to integrate into a general purpose platform in a way that cannot be compromised.

SUMMARY

The techniques discussed herein employ an optical security device to view sensitive information provided in an obscured format via a potentially untrusted and/or compromised computer. The techniques enable use of untrusted computers for access to sensitive information. The optical security device employs one or more forms of visual cryptography to reveal sensitive information that is provided in an obscured form by a potentially untrusted computer.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs)), and/or technique(s) as permitted by the context above and throughout the document.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Embodiments provide techniques and devices applicable to enhance security for sensitive transactions in untrusted environments including for scenarios in which user input can be captured from a properly configured terminal device, such as a smart-phone, a tablet computer, a laptop or a desktop computer, an e-book reader, a retail kiosk, and/or an automated teller machine (ATM). That is, embodiments enhance security when the hardware and/or the software of a terminal device are compromised and at least some embodiments also enhance security when the terminal device is secure and has a secure software stack. One example of an attack against which embodiments enhance security is from an attacker's subsequent readout of memory in the graphics subsystem. Various embodiments include techniques and devices that allow users to see (decrypt) information in images presented on the screen of a terminal device that is otherwise unrecognizable (encrypted). When implemented in conjunction with a touch-screen, some embodiments enable the design of authentication dialogs that are resistant against touch-input logging. Several embodiments can be used with smart phones, tablet computers, laptop or desktop computers, e-book readers, retail kiosks, and/or ATM machines. In at least one embodiment, the security enhancement techniques described herein are implemented in a single-machine/single-processor environment, and in at least one embodiment, the security enhancement techniques described herein are implemented in a single-machine/multi-processor environment.

Meanwhile, in at least one embodiment, the security enhancement techniques described herein are implemented in a network-distributed environment. The network-distributed environment may include one or more types of computing resources, which types of computing resources may include computing, networking and/or storage devices. A network-distributed environment may also be referred to as a cloud-computing environment.

Various embodiments are described further with reference to FIGS. 1-9.

Illustrative Environment

Figure 1:
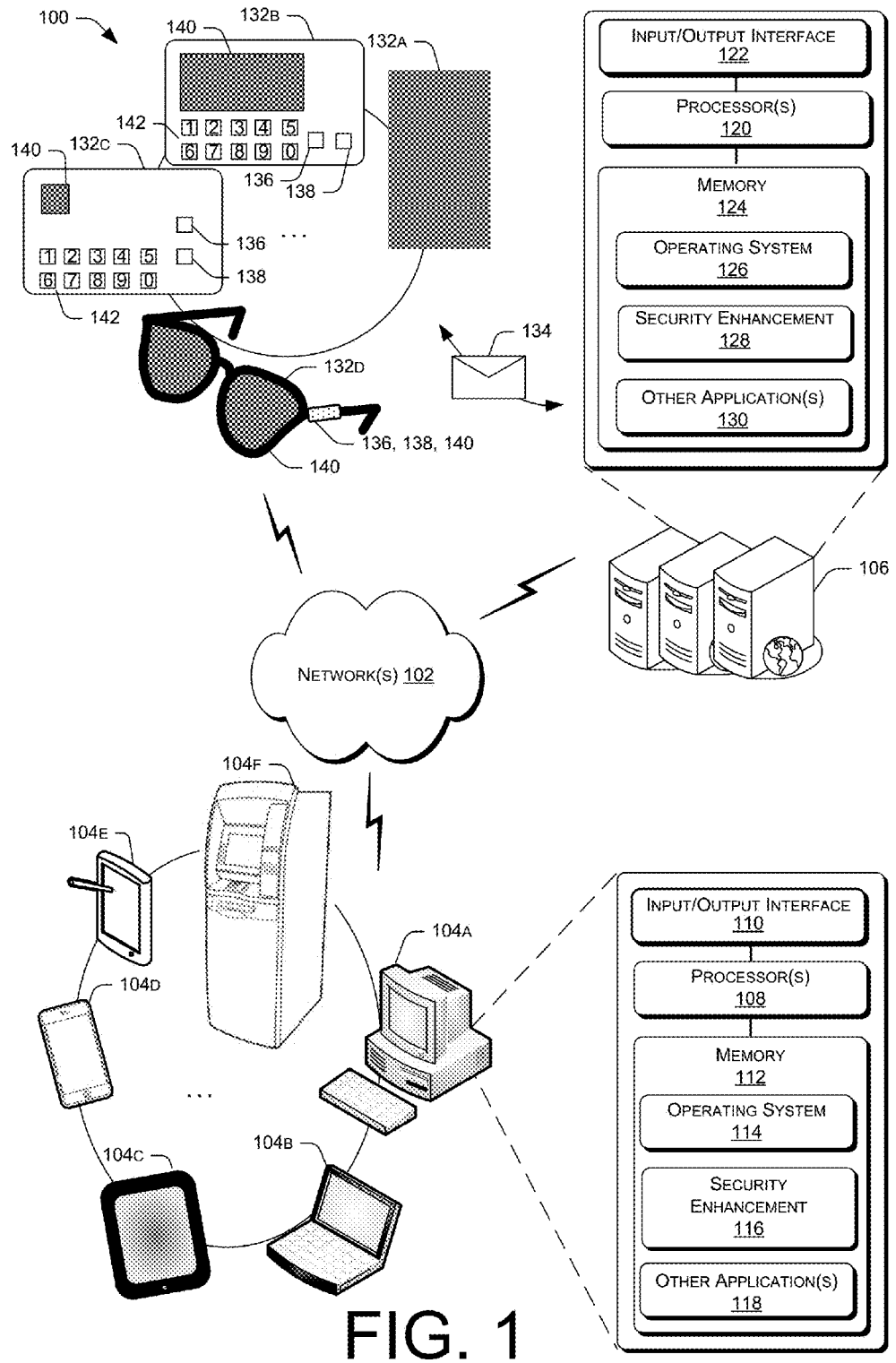
FIG. 1 is a block diagram depicting an example environment in which embodiments of security enhancement can operate.

The environment described below constitutes but one example and is not intended to limit the claims to any one particular operating environment. Other environments may be used without departing from the spirit and scope of the claimed subject matter. FIG. 1 shows an example environment 100 in which embodiments of security enhancement as described herein can operate. In some embodiments, the various devices and/or components of environment 100 include one or more network(s) 102 over which a client computing device 104, also referred to herein as a client device, a terminal device, or simply a device 104 may be connected to a server 106. The environment 100 may include multiple networks 102, a variety of devices 104, and/or a plurality of servers 106, any or each of which can be controlled by or can serve an entity like a bank, healthcare institution, government agency, or company.

For example, network(s) 102 can include public networks such as the Internet, private networks such as an institutional and/or personal intranet, or some combination of private and public networks. Network(s) 102 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 102 can utilize communications protocols, including packet-based and/or datagram-based protocols such as internet protocol (IP), transmission control protocol (TCP), user datagram protocol (UDP), or other types of protocols. Moreover, network(s) 102 can also include a number of devices that facilitate network communications and/or form a hardware basis for the networks, such as switches, routers, gateways, access points, firewalls, base stations, repeaters, backbone devices, and the like.

In some embodiments, network(s) 102 can further include devices that enable connection to a wireless network, such as a wireless access point (WAP). Embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various embodiments, client devices 104 include devices such as devices 104A-104F. Embodiments support scenarios where device(s) 104 can include one or more computing devices that operate in a cluster or other grouped configuration to share resources or for other purposes. Although illustrated as a diverse variety of device types, device(s) 104 can be other device types and are not limited to the illustrated device types. Device(s) 104 can include any type of computing device with one or multiple processor(s) 108 operably connected to an input/output interface 110 and memory 112. Device(s) 104 can include but are not limited to the illustrated devices 104. For example, devices 104 can include personal computers such as, for example, desktop computers 104A, laptop computers 104B, tablet computers 104C, telecommunication devices 104D, personal digital assistants (PDAs) 104E, electronic book readers, wearable computers, automotive computers, and/or gaming devices. Devices 104 can also include business or retail oriented devices such as, for example, automated teller machines (ATMs) 104F, server computers 106, thin clients, terminals, and/or work stations. In some embodiments, devices 104 can include, for example, components for integration in a computing device, appliances, or another sort of device.

In some embodiments, as shown regarding device 104(A), memory 112 can store instructions executable by the processor(s) 108 including an operating system 114, a framework for security enhancement 116, and other modules, programs, or applications 118 that are loadable and executable by processor(s) 108. Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The memory 112 is an example of computer-readable storage media and may include volatile memory, nonvolatile memory, and/or other persistent and/or auxiliary computer-readable storage media. Thus, the memory 112 includes tangible and/or physical forms of media included in a device and/or hardware component that is part of a device or external to a device, including but not limited to random-access memory (RAM), static random-access memory (SRAM), dynamic random-access memory (DRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. However, memory 112 and the described computer-readable storage media encompassed thereby do not include communications media consisting solely of propagated signals, per se.

Device(s) 104 can further include one or more input/output (I/O) interfaces 110 to allow a device 104 to communicate with other devices. Input/output (I/O) interfaces 110 of a device 104 can also include one or more network interfaces to enable communications between computing device 104 and other networked devices such as other device(s) 104 and/or server(s) 106 over network(s) 102. Input/output (I/O) interfaces 110 of a device 104 can allow a device 104 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network.

In various embodiments, server(s) 106 can host a cloud-based service. Embodiments support scenarios where server(s) 106 can include one or more computing devices that operate in a cluster or other grouped configuration to share resources, balance load, increase performance, provide failover support or redundancy, or for other purposes. Server(s) 106 can include any type of computing device with one or multiple processor(s) 120 operably connected to an input/output interface 122 and memory 124.

In some embodiments, as shown regarding server(s) 106, memory 124 can store instructions executable by the processor(s) 120 including an operating system 126, a framework for security enhancement 128, and other modules, programs, or applications 130 that are loadable and executable by processor(s) 120. Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The memory 124 is another example of computer-readable storage media and may include volatile memory, nonvolatile memory, and/or other persistent and/or auxiliary computer-readable storage media. Server(s) 106 can further include one or more input/output (I/O) interfaces 122 to allow a server 106 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Input/output (I/O) interfaces 110 of a server 106 can also include one or more network interfaces to enable communications between computing server 106 and other networked devices such as other server(s) 106 or devices 104 over network(s) 102.

In various embodiments, server(s) 106 can represent a cloud based service, a centralized service particular to an entity such as a banking institution, a healthcare institution, a government agency, a school system, or a company. Server(s) 106 can include programming to send a user interface to one or more device(s) 104. For example, server(s) 106 can store or access a user profile, which can include information a user has consented the entity collect such as a user account number, name, address, personal identification number (PIN), password, and/or information about one or more client device(s) 104 that the user can use for sensitive transactions in untrusted environments. In addition, server(s) 106 can include programming to produce all or part of one or more optical security device(s) 132. For example, server(s) 106 can produce or configure all or part of optical security device(s) 132 based on user profiles. Although server(s) 106 can send communication to both device(s) 104 and optical security device(s) 132, in some embodiments, communications are not sent between device(s) 104 and optical security device(s) 132.

Optical security devices 132 implement two factor authentication. In various embodiments, optical security devices 132 include optical security devices such as optical security devices 132A-132D. In various embodiments, optical security device(s) 132 can include one or more optical security devices that are relatively inexpensive to produce and that allow users to see information in graphical user interfaces that would otherwise be unrecognizable. An optical security device 132 is a visible physical component that is reusable and can secure an application against a device 104 having a compromised software stack. An entity associated with server(s) 106 can provide an optical security device 132 to a user by mailing or otherwise physically sending 134 the optical security device 132 toward the user. In some embodiments, physically sending 134 indicates that the entity can provide entity specific programming to an existing optical security device 132. Although illustrated as a diverse variety of device types, optical security device(s) 132 can be other device types and are not limited to the illustrated device types.

For example, optical security device(s) 132 can include a static type of optical security device 132A for use as an optical layer in the form of a thin flexible sheet upon which a random pattern has been physically applied such as via printing. Optical security device 132A, also called a privacy foil or simply a foil, operates on the principle of a one-time pad for use with a device 104. Such a foil is an inexpensive component to be manufactured for use in conjunction with a user interface that conceals information on a display of device 104.

Other examples include dynamic type optical security device(s) 132, such as optical security devices 132B, 132C, and 132D, and in some instances another device 104 can serve as a dynamic type optical security device 132 using a camera lens and the LCD of device 104. Embodiments of the type of optical security device 132B, are configured to be laid on a display of device 104, while embodiments of the type of optical security device 132C, are configured to be used similar to the lens of a magnifying glass, and embodiments of the type of optical security device 132D, are configured to be worn as glasses. Each of optical security devices 132B, 132C, and 132D includes a micro-controller 136, a power supply 138, and a window 140, which in some instances includes a transparent liquid crystal display (LCD) to be interposed between an eye of a user and a display of device 104. For example, dynamic optical security device 132B includes a transparent liquid crystal display (LCD) that includes a polarizer that can function as a programmable mask in conjunction with an LCD display of device 104.

The dynamic type optical security device(s) 132B, 132C, and 132D also include a key pad 142 in some embodiments. The key pad 142 can allow a user to input a personal identification number (PIN) and/or a seed received from a web site via an untrusted computer into the dynamic type optical security device(s) 132B, 132C, and 132D. Based on this information, the micro-controller can change the window 140 that is configured to be interposed between an eye of a user and a display of a potentially compromised or untrusted computer to allow the user to securely use the potentially compromised or untrusted computer.

In various embodiments, dynamic type optical security device(s) 132, such as optical security devices 132B, 132C, and 132D employ a spatial form of visual cryptography and/or a temporal form of visual cryptography. The micro-controller 136 of dynamic type optical security device(s) 132 employing a spatial form of visual cryptography can compute a pseudo-random pattern for display on the window 140, which serves as a one-time pad consistent with the discussion above regarding static type optical security device 132A.

Meanwhile, the micro-controller 136 of dynamic type optical security device(s) 132 employing a temporal form of visual cryptography controls a color sensor included in the dynamic type optical security device(s) 132. The color sensor can synchronize the dynamic type optical security device 132 to a sequence of images presented on a display of an untrusted computer such as device 104. The window 140 of the optical security device(s) 132 functions as a time-varying color filter that can also block all light. The micro controller 136 of optical security device(s) 132 reveals one image out of a larger set of images being simultaneously displayed as part of a graphical user interface on the display of an untrusted computer such as device 104 such as for a PIN or password, or for each digit of a PIN or password. For example, if a PIN or password includes four characters, the four characters can be presented in one concealed image of a set of images including multiple images that are simultaneously displayed on a display of device 104. As another example, if a PIN or password includes four characters, the four characters can be presented in a series of four sets of images, one for each character, can be displayed on a display of device 104, each set including multiple images that are simultaneously displayed.

Many such devices 104 are vulnerable to attacks that rely on accessing parts of the hardware. For example, a device 104 can display an image, and the underlying software may be secure, but the bits that form the image can be stored in a frame buffer. That frame buffer is part of the memory of device 104 that can retain the state. Other programs may be allowed to look at the frame buffer part of memory. For example the hardware may be compromised or the frame buffer data may be available simply because that frame buffer data is not protected like the memory states that the program is using. Thus, malicious programs can access the bits in the frame buffer. While such malicious programs are not directly compromising the software stack, they are compromising the security of information provided via the device 104.

Other attack vectors for device 104 can include keystroke loggers, touch screen recorders, and mouse captures. Keystroke loggers can record and send every keystroke entered to an adversary. Meanwhile, touch screen recorders can record and send the coordinates of each touch event. In addition, mouse information can be intercepted, captured, and sent to an adversary. Keystroke, touch, gesture, and mouse information can also reside in hardware that may not be secure or protected, similar to the frame buffer location discussed above. Optical security device(s) 132 guard against attacks that are not a security hole in the classical sense, but that still represent an exploitable leak of information such as attacks that rely on accessing parts of the hardware of device 104. Such attacks can include screen captures, keystroke loggers, touchscreen records, and/or mouse captures.

Figure 2:
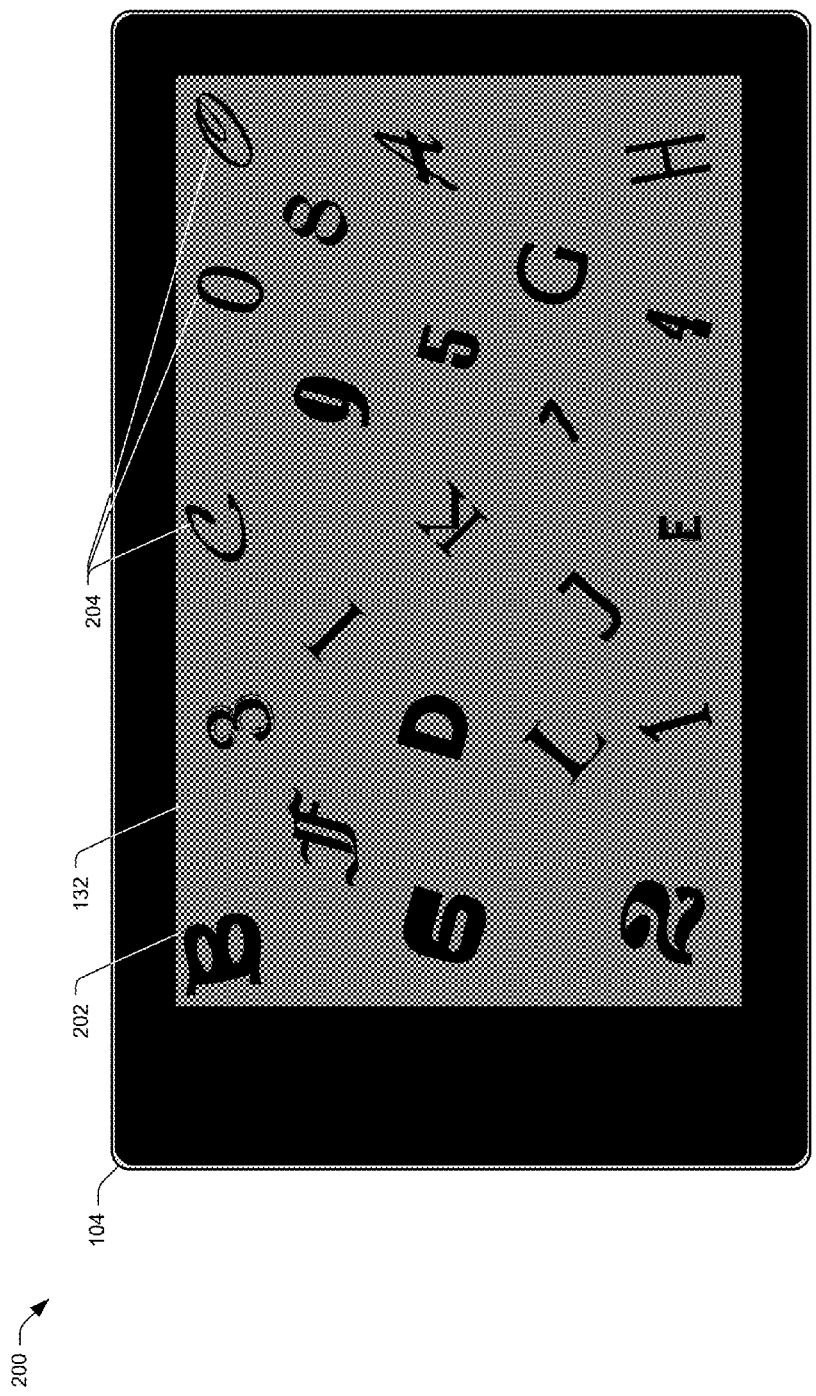
FIG. 2 is an example implementation of a security enhancement technique according to various embodiments.

FIG. 2 depicts an example implementation of a security enhancement technique for use with a device 104, which can include a touch screen. In various implementations, device 104 can represent a smart phone, a kiosk, a display in a public or semi-public area, and ATM machine, or any other device that displays information that a user interacts with by providing private information for authentication. Such private information can include a PIN, a password, etc. in accordance with a user profile. In the example illustrated at 200, the graphical user interface 202 of a device 104 includes information presented in multiple fonts 204 at randomized locations. As illustrated, the information is revealed via the use of an optical security device 132. In the example illustrated at 200, optical security device 132 is shown as a static type optical security device 132A although a dynamic type optical security device such as any of optical security devices 132B, 132C, OR 132D can alternately be employed. Another graphical user interface 202 will be generated for subsequent uses of the device 104 such that information can be presented in additional or alternate fonts 204, which may be at additional or alternate randomized locations. Thus, an adversary performing a screen grab or capturing selection information from touch, gesture, or mouse events, will only gain information applicable to that particular entry, and the information will not be exploitable for a future use.

Security enhancement including two-factor authentication as described herein allows users to conduct secure transactions with an untrusted and potentially compromised device 104. Security enhancement relies on an optical security device 132 to obtain concealed information that otherwise is unavailable, even when a device 104 is multiply compromised. For example, a touch screen logger can transmit every touch to a malicious site, but by employing the security enhancement techniques described herein, the malicious site cannot harvest useful information. The attacker may obtain a screen grab and the gestures or touch locations, but due to visual obfuscation of the characters and the randomized location of characters, the attacker will not obtain the meaning of the entries. The next time the device 104 is used for the same authentication, the graphical user interface and the gesture or touch locations will be different, so the attacker cannot aggregate screen grabs and gesture or touch events to obtain information.

Optical security device 132 works with a specialized graphical user interface presented via a display of device 104. The specialized graphical user interface obfuscates information in one or more of a variety of ways to supplement authentication mechanisms such as PINs and/or passwords. In this two factor authentication scheme, one factor includes a PIN or password, and a second factor includes an optical security device 132. Specialized graphical user interfaces in this regard can obfuscate or conceal information by employing a variety of fonts, sometimes simultaneously, by randomizing the locations where characters are presented, as compared to using a typical grid or keyboard pattern, by varying colors used to present information, and/or by simultaneously presenting multiple pieces of information or images such that desired information is obscured by additional random information or images. In various embodiments more than one of these techniques can be employed. For example, an interface can show a keyboard of sorts, but with the keys in random places, not where one would expect them to be. As another example, numerals for a numeric keypad can be located in a circle having random order, or in some checker board pattern, or in a completely random design. Moreover, the characters being presented can be in different sizes, colors, etc. Thus, when a user enters his or her PIN, the screen touch locations are not in the same place for successive uses of the device.

While an attacker may obtain the gesture or touch coordinates, because the location of the numbers on the screen is random as generated by a server controlled by an entity like a bank, healthcare institution, government agency, or company, for example, only the entity has knowledge of what the gesture or touch location actually means at that point in time. The attacker does not learn that the user gesturing or touching the screen at this position at this time represents selection of any particular character. The next time the screen is used for access that same character could be located anywhere on the screen. Consequently, the attacker learning the location relative to the gesture or that is touched does not convey the information that the user entered that character.

Figure 3:
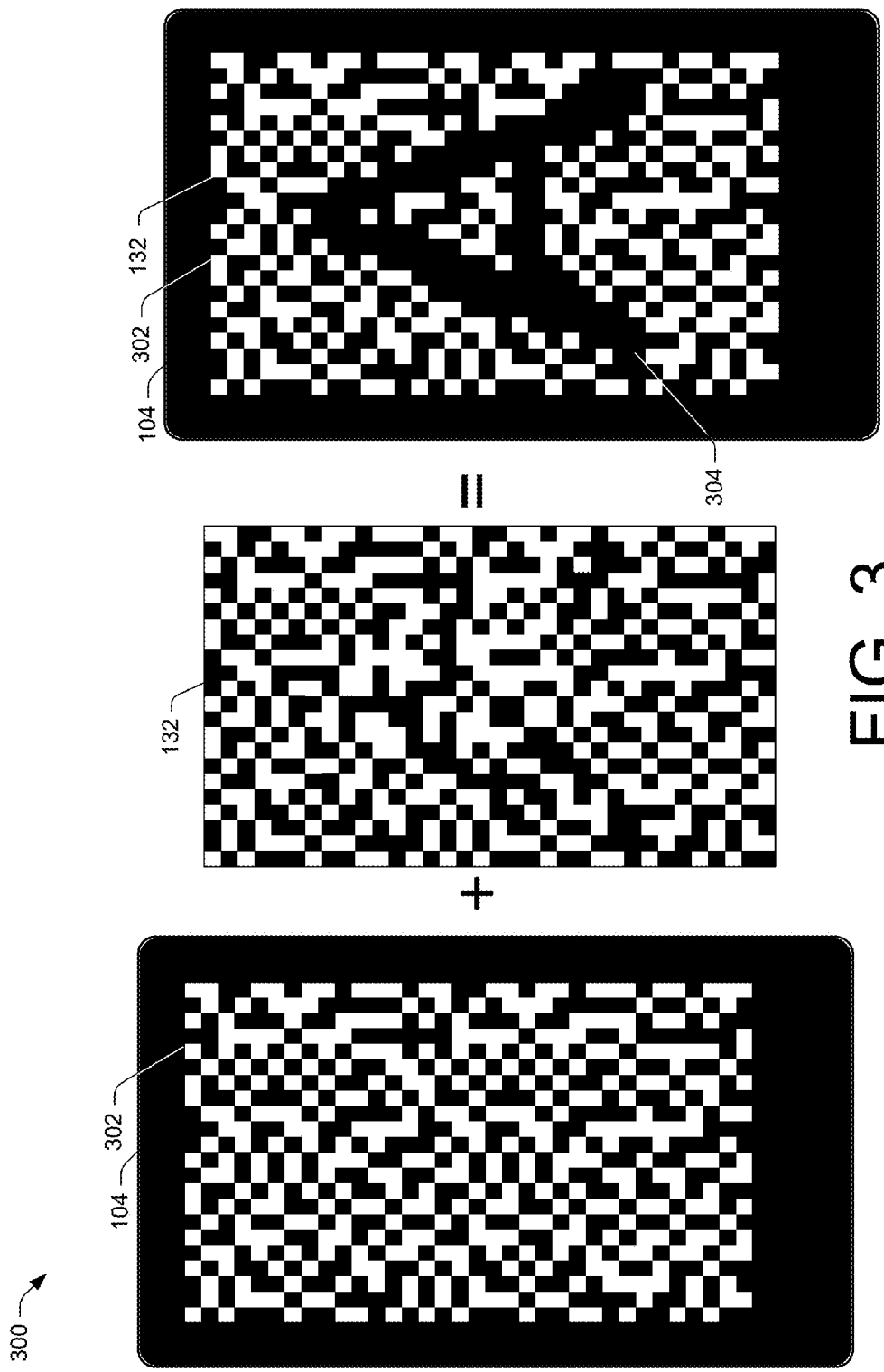
FIG. 3 is an example implementation of a security enhancement technique employing a static type optical security device according to various embodiments.

FIG. 3 at 300 depicts an example implementation of a security enhancement technique employing a static type optical security device according to various embodiments. A device 104 presents a graphical user interface 302 with concealed information. The display of device 104 shows what appear to be random pixels. If an attacker captures the display information, all that the attacker obtains is a screen of seemingly random pixels.

Graphical user interface 302 can be created to show different fonts, various sizes and orientations of characters, and/or soft key locations in random screen positions, thus avoiding a regular and predictable grid pattern in the graphical user interface 302. In some embodiments, graphical user interface 302 can include symbols that are randomly shown in different colors and that randomly alter between light on gray and dark on grey, and/or are presented in textures rather than solid colors to reduce the amount of information that may be leaked. Graphical user interface 302 can employ a random pattern for a background color of the image. Since the background is usually more than half of an image, employing a random pattern as the background can reduce perceivable contrast as it produces a grainy, grey background while it protects against information being leaked to the attacker from most of the image. Meanwhile, textures can also reduce the amount of predictability and thus prolong the key lifetime.

To make use of the graphical user interface 302, a user places an optical security device 132, such as a static type optical security device 132A, over at least a part of the graphical user interface 302. In conjunction with the graphical user interface 302, optical security device 132A allows the user to see the information embedded in the seemingly random pattern.

As discussed above, the device 104 may be compromised, but via use of the optical security device 132A, an attacker cannot obtain useful information by intercepting user entries.

Optical security device(s) 132A, can be manufactured inexpensively by using a laser or inkjet printer, in some instances having high resolution, to physically print pseudo-random patterns on a substantially translucent material such as biaxially-oriented polyethylene terephthalate (BoPET), which is a polyester film made from stretched polyethylene terephthalate (PET) or plastic. Because the optical security device 132A is fabricated from a non-conductive material, it does not interfere with capacitive touch screen mechanisms.

A random pattern is printed onto the optical security device 132A. In various embodiments, about half of the pixels of the display of device 104 in the area over which optical security device 132A is laid are covered by printed portions of optical security device 132A when the foil is laid over the display. Contemporary LCD screens in smart phones screens have a few million pixels, thus the key is equivalent to a few megabits of information.

In some embodiments the pattern is printed on the optical security device 132A at a resolution that substantially matches the resolution of a display screen with which the optical security device 132A will be used. An entity can then associate an optical security device(s) 132A having a particular pattern with a particular user (and the user's identified screen resolution) in accordance with the user's profile and physically transmit the optical security device(s) 132A to the user. By using the optical security device 132A with an obscured graphical user interface like graphical user interface 302, the user can interact with sensitive information that is otherwise unavailable.

To use optical security device 132A, a user aligns the optical security device 132A with the screen of the device 104 displaying the graphical user interface 302. Due to the layers involved in screen technology there will be a distance of around about one to three millimeters between the pixels being displayed and the optical security device 132A being placed on the screen. Thus, in order for the optical security device 132A to reveal the concealed information 304, the optical security device 132A should be properly aligned. This alignment feature can also restrict the viewing angle, which allows the optical security device 132A to serve as a privacy screen against over the shoulder or other observation attacks. While physical positioning of the optical security device 132A provides for major alignment, in some embodiments, fine alignment of the pattern of the optical security device 132A and pixels of the graphical user interface 302 can be completed by tilting the optical security device 132A and display presenting graphical user interface 302 as a unit.

Optical security device(s) 132A are relatively inexpensive, and operate as a fully secure one-time pad if used only once. However, that would be cumbersome. An optical security device 132A is reusable for multiple uses as long as the number of reuses does not provide enough information for an attacker to reconstruct the key. An optical security device 132A can be supplied to the user via mail or physical delivery by the entity that offers the security enhancement. For example, a bank can mail one or more optical security devices 132A to a bank customer, or the customer could obtain the optical security devices 132A from a bank branch. Effectively, the optical security device 132A constitutes a private key that is shared by the user and the entity.

The strength of a system employing an optical security device 132A diminishes with the number of times that the optical security device 132A is reused. If an attacker were to be able to capture every graphical user interface 302 (cipher image), it could become possible for the attacker to eventually break the system and reconstruct a copy of the optical security device 132A. For example, if the transmitted image were to show black digits on a solid white background, the attacker could proceed on the assumption that most of the image is white background, which could eventually lead to a reconstruction of the optical security device 132A (known plain-text attack of a one-time pad).

Thus, in various embodiments, to minimize information leakage that may aid in the reconstruction of the optical security device 132A, measures can be taken towards prolonging the useful lifetime of the optical security device 132A. Such measures can include one or more of, the use of a truly random pattern for the background color of the graphical user interface 302 images, the use of different optical security device 132A orientations, e.g., a rectangular foil could be attached to the screen in four different orientations, randomization of the characters presented in graphical user interface 302, using dots printed in the complementary colors to effectively triple the size of the key encoded in the foil, e.g., yellow dots block only the light from blue pixels, magenta dots block only the light from green pixels and cyan dots block only the light from red pixels, and the like.

As discussed above, using different fonts, orientations and/or sizes of characters, colors, textures, etc. in the graphical user interface 302 can increase the search space for the attacker as it makes the key-pad image less predictable. Combined, these measures can require an attacker to collect a very large number (100's to 1000's) of graphical user interface 302 images before it becomes possible to reconstruct the optical security device 132A. Moreover, such an attack is complicated by the fact that these images are random patterns, which can prevent the attacker employing any form of compression because compression would reduce the entropy and render the images useless for key-breaking. Thus an attacker is burdened with transmitting a large amount of data from the device 104 without arousing suspicion. For example, the data volume originating from a smartphone is generally low compared to data flowing to the smartphone. Thus, a large amount of data flowing from a smartphone could be detected. In addition, the attacker will have to store all of this data until reconstruction becomes feasible. Thus the security gain from this technique can be significant compared to its low cost.

A benefit of optical security device 132A, is that while the user interacts with optical security device 132A no information of that interaction is able to be captured. The user's brain is registering the private information 304 seen through the optical security device 132A. However, no clear text is transmitted and the location, font, and/or color of soft keys can be randomized. Thus, multiple layers of randomization are employed including at least the pattern on the optical security device 132A and the pattern of the graphical user interface 302.

FIG. 3 illustrates a static type optical security device 132 such as 132A to reveal private information 304 that was otherwise obscured in graphical user interface 302. In this illustration private information 304 is represented by the letter "A." In some embodiments, a dynamic type optical security device such as any of optical security devices 132B, 132C, OR 132D can alternately be employed when configured to work with a spatial form of visual cryptography to reveal private information 304 that was otherwise obscured in graphical user interface 302.

Figure 4:
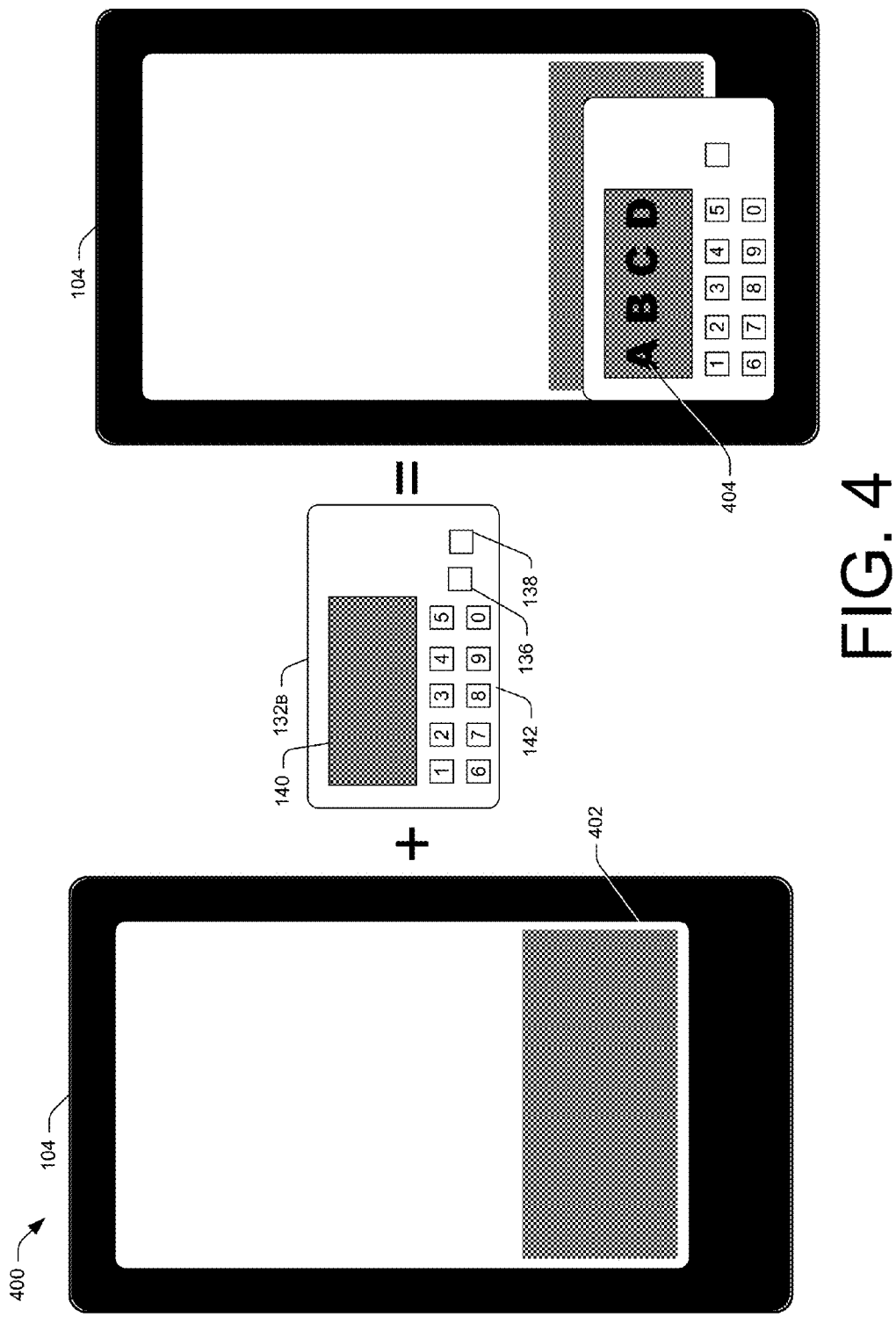
FIG. 4 is an example implementation of a security enhancement technique employing a dynamic type optical security device configured to implement a spatial form of visual cryptography according to various embodiments.

FIG. 4 at 400 depicts an example implementation of a security enhancement technique employing a dynamic type optical security device configured to implement a spatial form of visual cryptography according to various embodiments.

A device 104 presents a graphical user interface 402 with concealed information. Similar to the discussion regarding graphical user interface 302, the display of device 104 shows what appears to random pixels in at least one area of the screen. If an attacker captures the display information, all that the attacker obtains is an area of seemingly random pixels.

To make use of the graphical user interface 402, a user places an optical security device 132, such as a dynamic type optical security device 132B, over at least a part of the graphical user interface 402. In conjunction with the graphical user interface 402, optical security device 132B allows the user to see the information 404 embedded in the seemingly random pattern. As discussed above, the device 104 may be compromised, but via use of the optical security device 132B, an attacker cannot obtain useful information by intercepting user entries.

Optical security device(s) 132B, can be manufactured relatively inexpensively, for example on the order of ten-times the cost of manufacturing a credit card containing a radio frequency identification chip (RFID), which is negligible in the context of overall production and distribution costs for such devices. Optical security device(s) 132B include a window 140, which is a transparent, partial LCD display that has a small LCD panel and a polarizer. In conjunction with an LCD display of a device 104, the LCD layer and polarizer of the window 140 of optical security device 132B can function as a programmable mask. This optical security device 132B can be placed in front of a display of device 104 and operate in a similar manner as the optical security device 132A described above. However for the optical security device 132B a random pattern is created dynamically using the LCD window 140 and a micro-controller 136 and power supply 138 embedded in the optical security device 132B.

Screens of devices 104, like cell phones, employ a polarizer and LCD matrix technology such that the light that comes out of the screen of a device 104 is already polarized. An optical security device 132 including another polarizer and LCD window 140 to be interposed between the eye of a user and the screen of device 104 can modulate the light from the screen of device 104 without having a third polarizer. Because manufacturing costs are contained, a dynamic type optical security device 132 such as optical security device 132B can have an LCD window 140 without a light source or another component that typically would consume a significant amount of power. In addition, by including a microprocessor, such as micro-controller 136, which produces a pseudo-random pattern, which in some implementations is based in part on some input from the user, and in other instances is based on a sequence like a one-time pad, a dynamic type optical security device 132 can produce innumerable distinct patterns.

Thus, while an electronic implementation is more expensive due to the cost of included electronics such as the micro-controller 136 and the power supply 138 a dynamic type optical security device 132 can be more universal because the pattern of the optical security device 132 can be changed for each use.

For example, two or more entities are unlikely to share information to create graphical user interfaces with each other, but with a dynamic type optical security device 132, a single dynamic type optical security device 132 can run code from multiple entities. Thus the opportunity for extended reuse, and decrease in repeatedly sending static type optical security device(s) 132 such as optical security device 132A can offset the additional manufacturing costs associated with the embedded electronics.

In some implementations each entity would develop its own dynamic type optical security device 132 for manufacture and use by that entity. However, in some implementations various entities can add their own code to a dynamic type optical security device 132.

As illustrated, an optical security device 132B can resemble a credit card, and in some implementation can include a key pad 142 in addition to the micro-controller 136, power supply 138, and LCD screen 140. During operation, a user can enter a PIN or password, and in some instances, a random seed from a remote web site associated with the entity providing the optical security device 132B, into the device 132 via the key pad 142. Based in this information, the micro-controller 136 can compute a pseudo-random pattern using a secure one-way function such as message digest algorithm-5 (MD5), a secure hash algorithm (SHA), etc. Information viewed through the window 140 will be perceivable to the user as described above regarding optical security device 132A.

Some embodiments may support polychromatic operation, while other embodiments support monochrome operation, which can ease the difficulty of aligning two LCD panels to sub-pixel precision. To reduce alignment requirements, the LCD panel of window 140 may be implemented with a lower resolution, on the order of 100 dots per inch (dpi), versus common smart phone displays, which have a resolution of 300 dpi or more. Manufacturing window 140 to include an LCD of lower resolution can also reduce manufacturing costs and enable the optical security device 132B to be used with multiple devices 104 having differing screen resolutions. Entities can make the dynamic type optical security devices 132 that will be useable with a variety of devices 104 including those with different size screens and different resolution screens. In addition, entities can associate a particular dynamic type optical security device 132 with a particular user such as via association with a user profile, which can enable the user to use it with multiple devices 104.

In some embodiments, additional functionality may be included such as a fingerprint reader in place of the key pad 142 to eliminate the need for entering a password, near field communication (NFC), which can avoid entry of a seed from a remote server such as server 106, and/or a light sensor on the display facing side of the optical security device 132B, which can be used to receive a seed in a bit-serial fashion by modulating image intensity near the sensor position, thus avoiding the need for manual transcription of the seed.

Each of dynamic type optical security device(s) 132 includes an embedded power supply 138, but overall power consumption of dynamic type optical security device(s) 132 is very small because the LCD panel of window 140 does not require fast updates and does not emit light. Because of this the power supply 138 can be a small, planar lithium-ion cell, or another type of embedded power supply, which can power a dynamic type optical security device 132 for an extended period of time. In various implementations the extended period of time can be longer than one year, without the dynamic type optical security device 132 exceeding the size of a credit card. In some implementations part of the dynamic type optical security device 132 can be covered by a solar cell to prolong battery life.

In various implementations of optical security device 132B, each session uses one or more different patterns so that the strength of the visual cryptography is preserved. Also some embodiments support multiple keys so that a single optical security device 132B can be used with multiple, independent entities. For embodiments having LCD window 140 with a lower resolution than the device(s) 104 with which it is to be used, a dynamic type optical security device 132 has less alignment restrictions and can be used in conjunction with multiple devices 104, which can be associated with a user in accordance with a user's profile.

In some embodiments the electrodes of the LCD panel 140 prevent operation of a touch sensor of a touch sensitive display of device 104. Such embodiments may employ a level of indirection to preserve security against touch screen and/or keystroke loggers. In such embodiments, graphical user interface 402 may occupy only a portion of the screen of device 104 so that the remaining area can be used to input information via touch. The encrypted image in area of graphical user interface 402 when viewed through a properly configured window 140 can then show the user a relation between an alphabetic input character and a numeral and/or between the input character and a set of abstract symbols, which may also employ a color component. For example, "to enter the digit 5 of your PIN touch the triangle or touch the red square." Thus a touch screen recorder would be able to record that the triangle symbol or red square was touched, but the attacker cannot infer which character this event represents because what the user enters is a randomized permutation that changes every time that the optical security device 132E is used so that by capturing the key sequence, the attacker obtains no useful information.

Figure 5A:
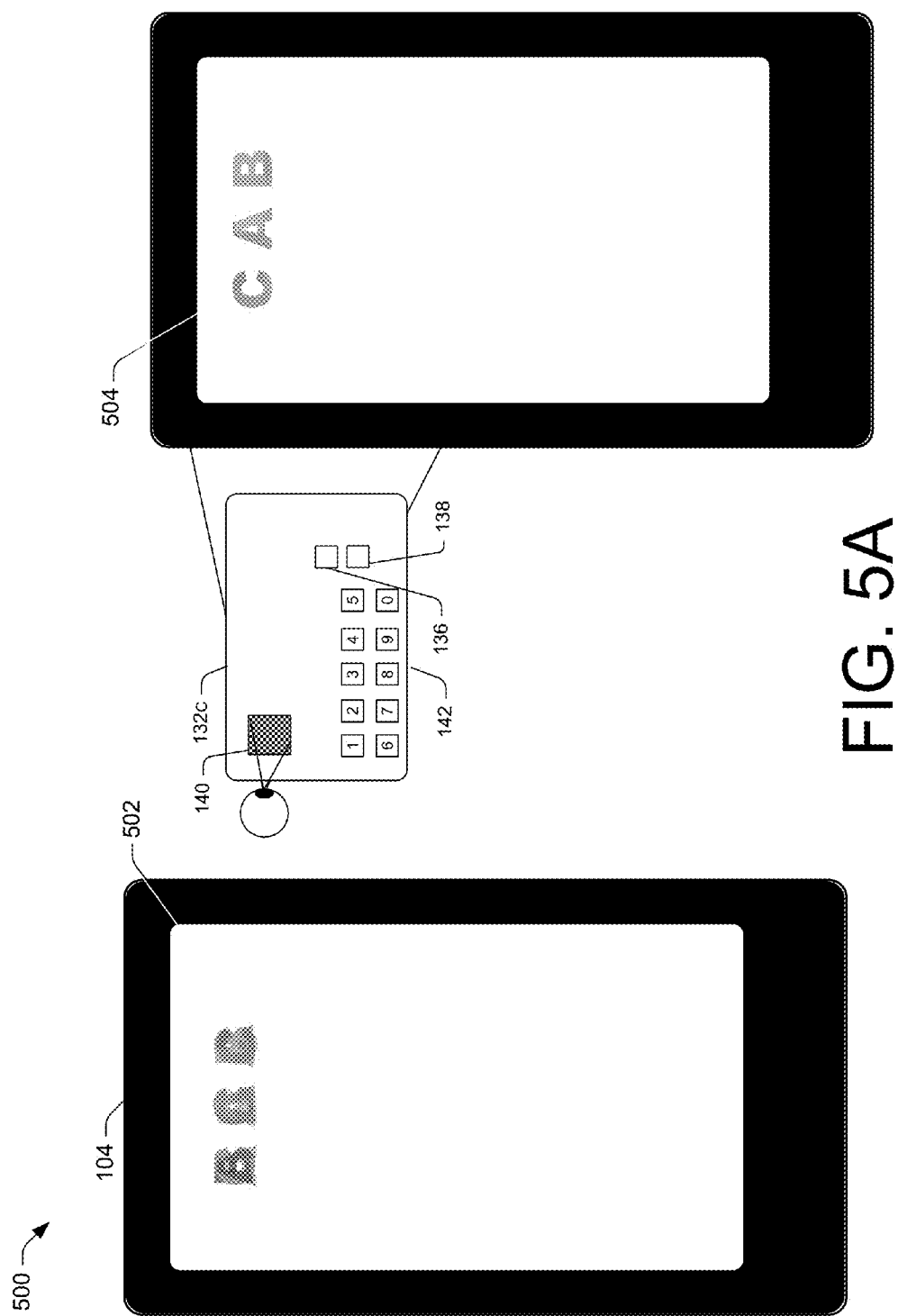
FIGS. 5A and 5B illustrate example implementations of a security enhancement technique employing a dynamic type optical security device configured to implement a temporal form of visual cryptography according to various embodiments.
Figure 5B:
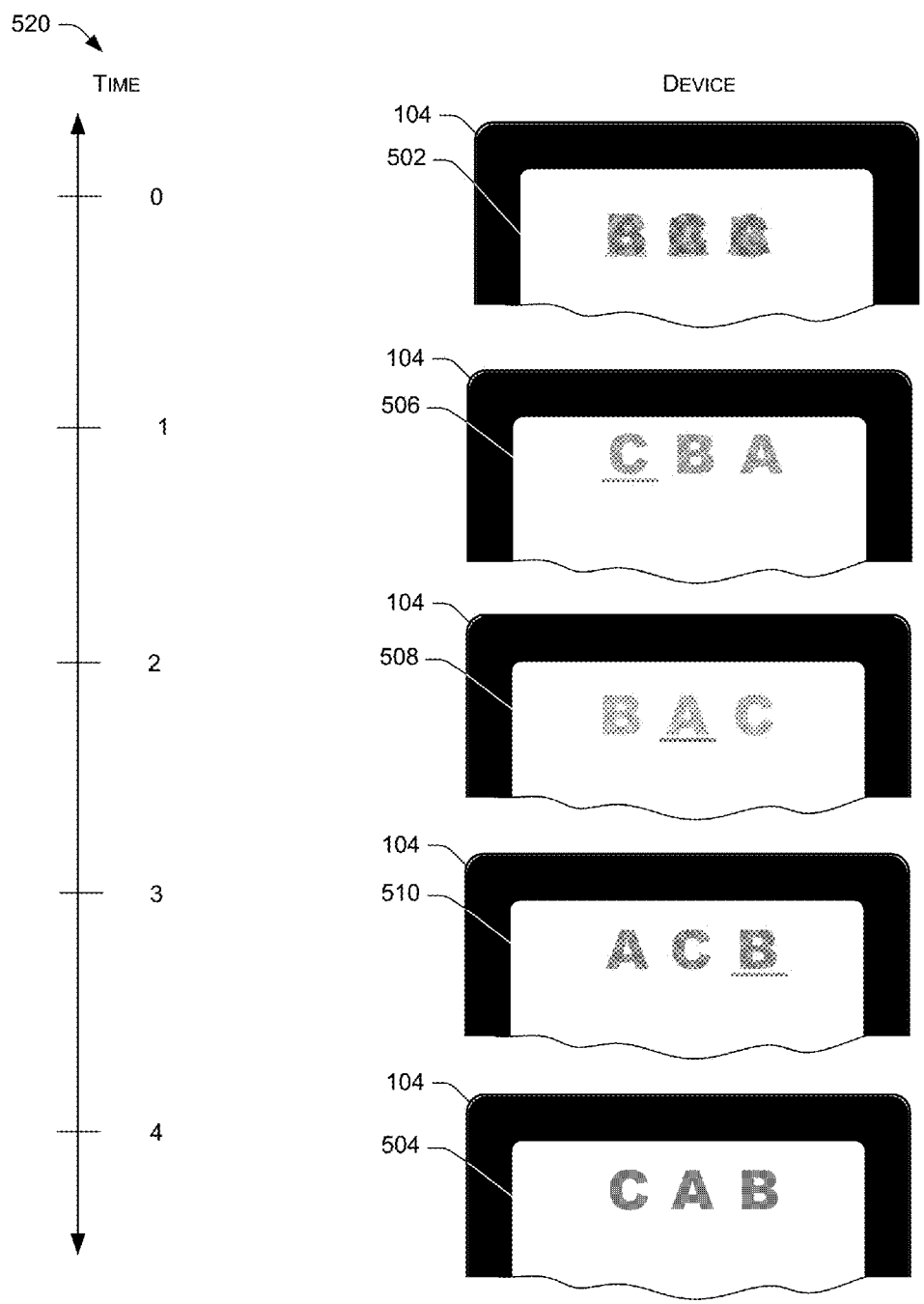

FIGS. 5A and 5B illustrate example implementations of a security enhancement technique employing a dynamic type optical security device configured to implement a temporal form of visual cryptography according to various embodiments.

In FIG. 5A at 500, a device 104 presents a graphical user interface 502 with concealed information. The display of device 104 shows what appears to a display of random overlaid colors in at least one area of the screen. If an attacker captures the display information, all that the attacker obtains is an area or image of seemingly random colors.

To make use of the graphical user interface 502, a user interposes an optical security device 132, such as a dynamic type optical security device 132C configured to work with a temporal form of visual cryptography, between the eye of the user and at least a part of the graphical user interface 502. In conjunction with the graphical user interface 502, optical security device 132C allows the user to see the information embedded in the seemingly random pattern as shown at 504. As discussed above, the device 104 may be compromised, but via use of the optical security device 132C, an attacker cannot obtain useful information by intercepting the screen or by intercepting user entries.

Optical security device(s) 132C can be manufactured relatively inexpensively. Optical security device(s) 132C include a window 140, which is a transparent, partial LCD display that has a small LCD panel and a polarizer. In conjunction with an LCD display of a device 104, the LCD layer and polarizer of the window 140 of optical security device 132C can function as a programmable color filter.

The display of the device 104 can show a sequence of images at a maximum frame rate, for example 60 frames per second. The window 140 through which the user can view the terminal screen includes an electronically controlled LCD shutter and/or color filter that can be programmed to block all light or to let only red, green, or blue light through.

This optical security device 132C can be placed in front of a display of device 104 and operate in a similar manner as the optical security device 132B described above. However, the optical security device 132C does not alter the spatial information of the images. Instead, the optical security device 132C either blocks an image entirely or it allows only the red, green or blue components (sub-images) to pass. Thus it would appear to the user as if she were looking at the screen of the terminal through colored sunglasses. In various implementations there is no image forming optics involved, rather the optical security device 132C functions as a time-varying color filter that can also block all light.

By accepting some light loss and flicker, the optical security device 132C simply reveals one image out of a larger set of images that are displayed simultaneously on the screen of the device 104. For example, by using a sequence of 4 consecutive frames, the user sees one image out of a set of 12 (4 frames times 3 colors). Because of the limitation that the filter is applied globally to the entire image, the key space for one frame can be rather small. In the example above, an adversary would only have to figure out which image out of the set of 12 candidates is the right one as shown at 504.

In FIG. 5B at 520, as discussed above, a device 104 presents a graphical user interface 502 with concealed information. Similar to the display of device 104 in FIG. 5A, the display of device 104 shows what appears to a display of random overlaid colors in at least one area of the screen. If an attacker captures the display information, all that the attacker obtains is an area of seemingly random colors.

To make use of the graphical user interface 502, a user interposes an optical security device 132, such as a dynamic type optical security device 132C configured to work with a temporal form of visual cryptography, between the eye of the user and at least a part of the graphical user interface 502. In conjunction with the graphical user interface 502, optical security device 132C ultimately allows the user to see the information embedded in the seemingly random pattern as shown at 504. As discussed above, the device 104 may be compromised, but via use of the optical security device 132C, an attacker cannot obtain useful information by intercepting the screen or by intercepting user entries.

A graphical user interface 502 is visible, but obscured, when viewed without the use of an optical security device 132C. By employing an optical security device 132C at times 1, 2, and 3, a series of graphical user interfaces are revealed until, at time 4, the private information has been revealed as shown at 504. Secure entry of a password or PIN can be achieved with a number of frames greater than or equal to the number of characters in the password or PIN and a number of images per frame being greater than or equal to the number of characters in the password or PIN. For example, each image can include graphical shapes such as squares, rectangles, circles, etc. and/or up to 94 separate characters representing the 94 printable American Standard Code for Information Interchange (ASCII) characters, characters in languages other than English, or any subset thereof.

For example, the secure entry of a short password is considered at 520. At time 0 the graphical user interface 502 provides a first set of 9 images (3 frames of 3 characters each). These frames are chosen so that on each screen position, each character appears in exactly one of the 9 images that are shown simultaneously. The user, observing the screen through the decoder device sees just one scrambled but complete set of keys.

At time 1 the optical security device 132C is synchronized to filter all but one color from graphical user interface 502 thereby providing a first key of the user's password 506. The user proceeds to press the first key of her password, which is transmitted to the remote server as one key-position. The attacker may acquire a copy of the image set and the key stroke location, but without knowing which sub-image is valid, it is not possible to infer anything about which digit is the first symbol of the password. After all, many possible characters can appear in the touch location in one frame of the set. After the first digit was entered, the process is repeated with a different set of images.

At time 2 the optical security device 132C is synchronized to filter all but a second random color from graphical user interface 502 thereby providing a second key of the user's password 508.

At time 3 the optical security device 132C is synchronized to filter all but a third random color from graphical user interface 502 thereby providing a third key of the user's password 510. Thus, by time 4, the password has been revealed. Although FIG. 5B illustrates the password being visible as shown at 504 for explanatory purposes, in some embodiments the entire password is not revealed simultaneously.

These images may be supplied by the server 106 sequentially on demand, or speculatively up-front prior to the password entry dialog to improve responsiveness. By changing the image set after each key-stroke, the attacker cannot rule out any password character from the intercepted information and gains no information. If only one image set were used, the attacker would know that the password is in a small set of 9 possible candidates and observation of multiple password entry dialogs would quickly narrow the set to the actual password. Thus, as of time 4 the optical security device 132C has been revealed each key of the user's password as shown at 504.

It turns out that a strong crypto-system can be constructed out of this facility. As another example, the secure entry of a pin-number is considered. The first set of 12 images (using the 4 frame example from above) can consist of 12 random permutations of the phone-key set (the digits 0 through 9 and the symbols # and *). These permutations can be chosen so that on each screen position, all symbols appear in exactly one of the 12 images that are shown simultaneously. The user, observing the screen through the decoder device sees just one scrambled but complete set of keys. She proceeds to press the first key of her PIN-number, which is transmitted to the remote server as one key-position. The attacker may acquire a copy of the image set and the key stroke location, but without knowing which sub-image is valid, it is not possible to infer anything about which digit is the first symbol of the PIN. After all, every possible digit appears in the touch location in one frame of the set. After the first digit was entered, the process is repeated with a different set of images. These images may be supplied by the server 106 sequentially on demand, or speculatively up-front prior to the PIN entry dialog to improve responsiveness. By changing the image set after each key-stroke, the attacker cannot rule out any PIN number from the intercepted information and gains no information. If only one image set were used, the attacker would know that the PIN is in a small set of 12 possible candidates and observation of multiple PIN entry dialogs would quickly narrow the set to the actual PIN number.

In various embodiments implementing the processes described regarding 520, the optical security device 132C can synchronize its operation to the image sequence shown on a screen of device 104. This can be accomplished with a color sensor on the screen-facing side of the optical security device 132C. Commercial, off-the-shelf color sensors have 3 photo diodes, each covered with a filter that only lets red, green and blue light reach the detectors. Such commercial color sensors do not need any imaging optics; rather it is sufficient that light from the screen of the terminal device is sensed by the detector triad. The detector essentially reports the total average red, green and blue light emitted by the screen. By changing the overall color balance of the images used in the authentication session, the terminal device has a low-bandwidth communication channel to the optical security device 132C. In some embodiments the low-bandwidth communication channel can be used to transmit the random seed from the remote server and to synchronize the optical security device 132C to the image sequence shown on the screen of the device 104.

As was the case regarding optical security device 132B, optical security device 132C can use a password to restrict use to its rightful owner, or it may include a biometric sensor (for example finger print reader) for this purpose. Optical security device 132C also may include access information in tamper-proof, secure storage for multiple, different entities. In either case, optical security devices 132B and 132C can enable use of untrusted computers for access to sensitive information in accordance with respective user's profiles.

Figure 6:
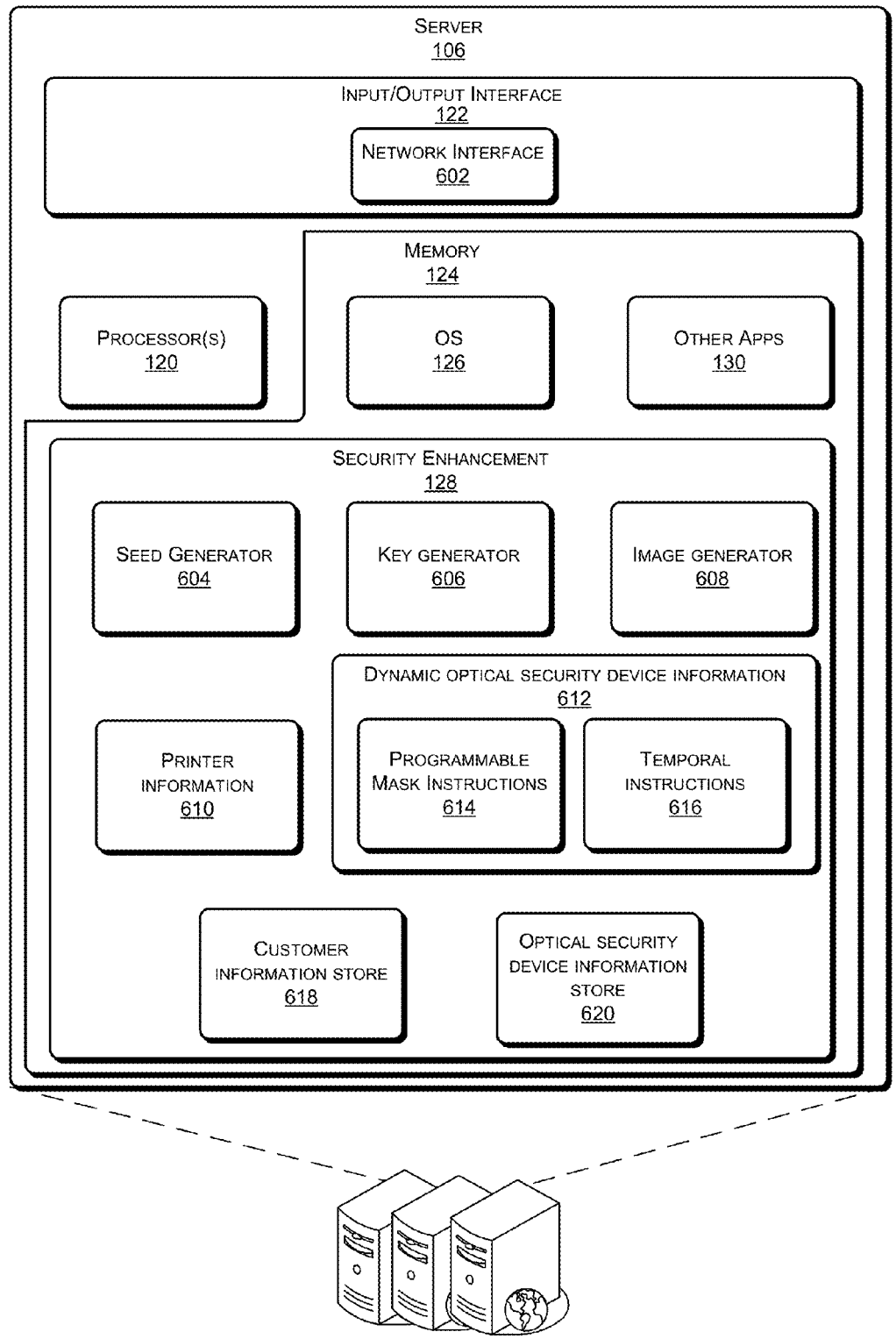
FIG. 6 is a block diagram depicting an example architecture that can perform operations related to security enhancement, according to various embodiments.

FIG. 6 illustrates select components of an example server 106 configured to provide a facility related to security enhancement according to various embodiments as described herein. Example server 106 includes an input/output interface 122 that can include a network interface 602, one or more processors 120, which can include microprocessors, and a memory 124. Network interface 602 enables server 106 to send and/or receive data over a network 102. Network interface 602 may also represent any combination of other communication interfaces to enable server 106 to send and/or receive various types of communication, including, but not limited to, web-based data and cellular telephone network-based data. Such network interface(s) can include one or more network interface controllers (NICs) or other types of transceiver devices to send and receive communications over a network. For example, server 106 can use network interface 602 to communicate an obscured graphical user interface to a device 104.

Memory 124 includes tangible and/or physical forms of media included in a device and/or hardware component that is part of a device or external to a device, including but not limited to random-access memory (RAM), static random-access memory (SRAM), dynamic random-access memory (DRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. However, memory 124, and the described computer-readable storage media encompassed thereby, does not include communications media consisting solely of propagated signals, per se.

An operating system (OS) 126, a security enhancement application 128, and any number of other applications 130 are stored in memory 124 as computer-readable instructions, and are executed, at least in part, on processor 120.

Security enhancement application 128 includes one or more of a seed generator 604 to generate random numbers, a key generator 606, an image generator 608, printer information 610 for printing a static type optical security device, e.g., 132A, and dynamic optical security device information 612, which in some instances include programmable mask instructions 614 and/or temporal instructions 616 to configure a window 140 of dynamic type optical security device(s) such as optical security device 132B, 132C, and/or 132D.

In various embodiments, image generator 608 can produce obscured graphical user interfaces such as graphical user interface 302, 402, and/or 502 including an obfuscation pattern as discussed above to be sent to device(s) 104 for presentation. As another example, in conjunction with the seed generator 604, the image generator 608 can produce a truly random pattern for the background color of the graphical user interface images to further obfuscate the private information. Meanwhile, printer information 610 can provide instructions for printing a cooperative optical security device 132A, for use with a particular obscured graphical user interface generated by image generator 608. For example, in conjunction with the key generator 606, printer information 610 can include instructions for programming a laser or inkjet printer to physically print a cooperative pattern at an appropriate resolution on substantially translucent material as discussed above. Moreover, printer information 610 can provide instructions for printing to accommodate printing in complementary colors and/or locations to prolong the expected useful life of a static optical security device 132 such as optical security device 132A. Dynamic optical security device information 612 can provide instructions for programming the optical security devices such as optical security devices 132B, 132C, and/or 132D. Such dynamic optical security device information can, in various embodiments, include one or both of programmable mask instructions 614 and/or temporal instructions 616. Dynamic optical security device information 612 can include programming to create a cooperative pattern for an LCD window 140 of optical security devices 132B, 132C, and/or 132D. In conjunction with one or more of the seed generator 604 and/or the key generator 606, dynamic optical security device information 612 can include programming to create an apparently random cooperative pattern. In various implementations the cooperative pattern is designed to employ spatial cryptography using programmable mask instructions 614, while in some implementations the cooperative pattern is designed to employ temporal cryptography or to function as a programmable color filter using temporal instructions 616.

In addition, memory 124 includes a secure store of customer information 618, and/or a secure store of optical security device information 620. The secure store of customer information 618, such as a user profile, and can include customer information of or controlled by an entity with whom the server 106 is associated. For example, such entities can include banks, healthcare institutions, government agencies, companies, etc., and the information can include information about the type of device(s) 104 with which a customer wants to use an optical security device 132 such as screen size and resolution. The secure store of optical security device information 620 can include various aspects optical security device information such as an average intensity and/or color spectrum of a particular graphical user interface, and/or associations of a particular optical security device 132 with a particular customer and/or device 104. In various embodiments the secure store of customer information 618, and/or the secure store of optical security device information 620 are stored separate from security enhancement application 128, and in other instances one or both of these can be stored in a configuration controlled by security enhancement application 128.

Illustrative Processes

Figure 7:
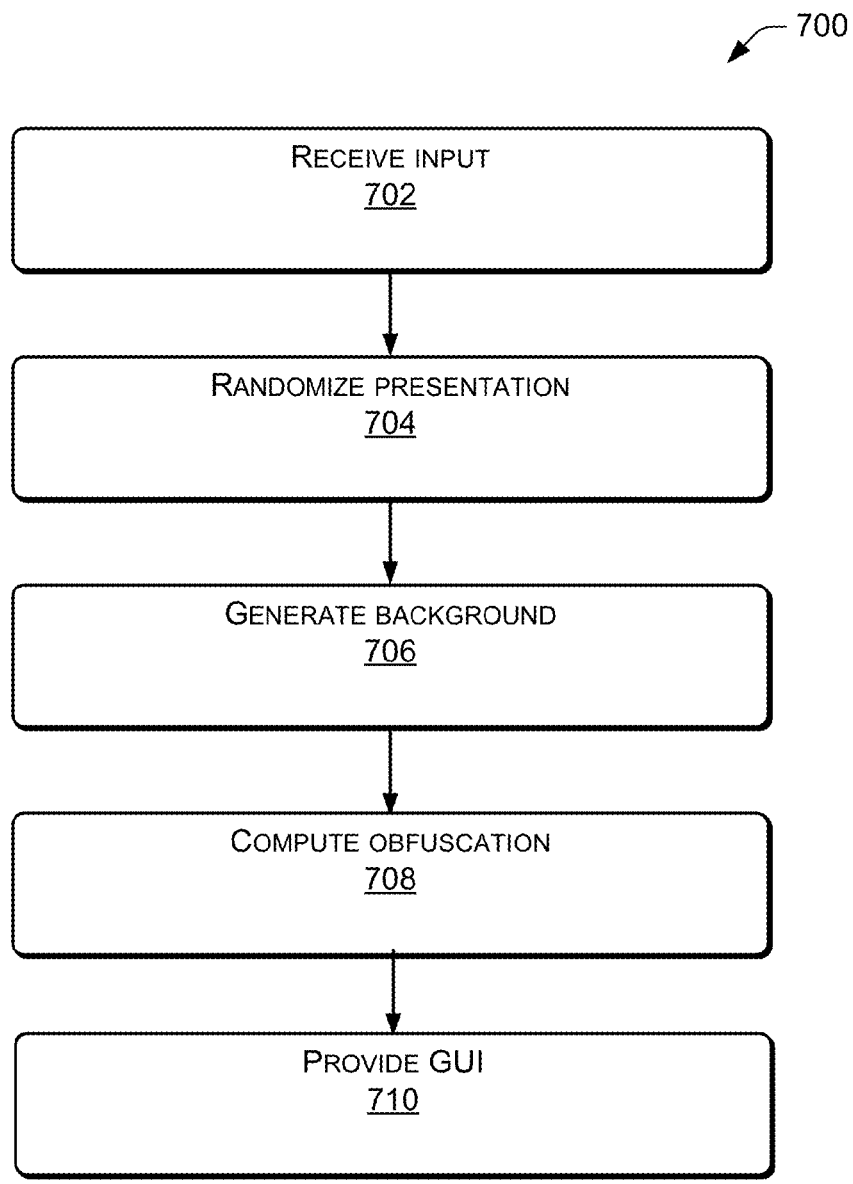
FIG. 7 is a flowchart illustrating an example process of generating an obscuring user interface, according to various embodiments.
Figure 8:
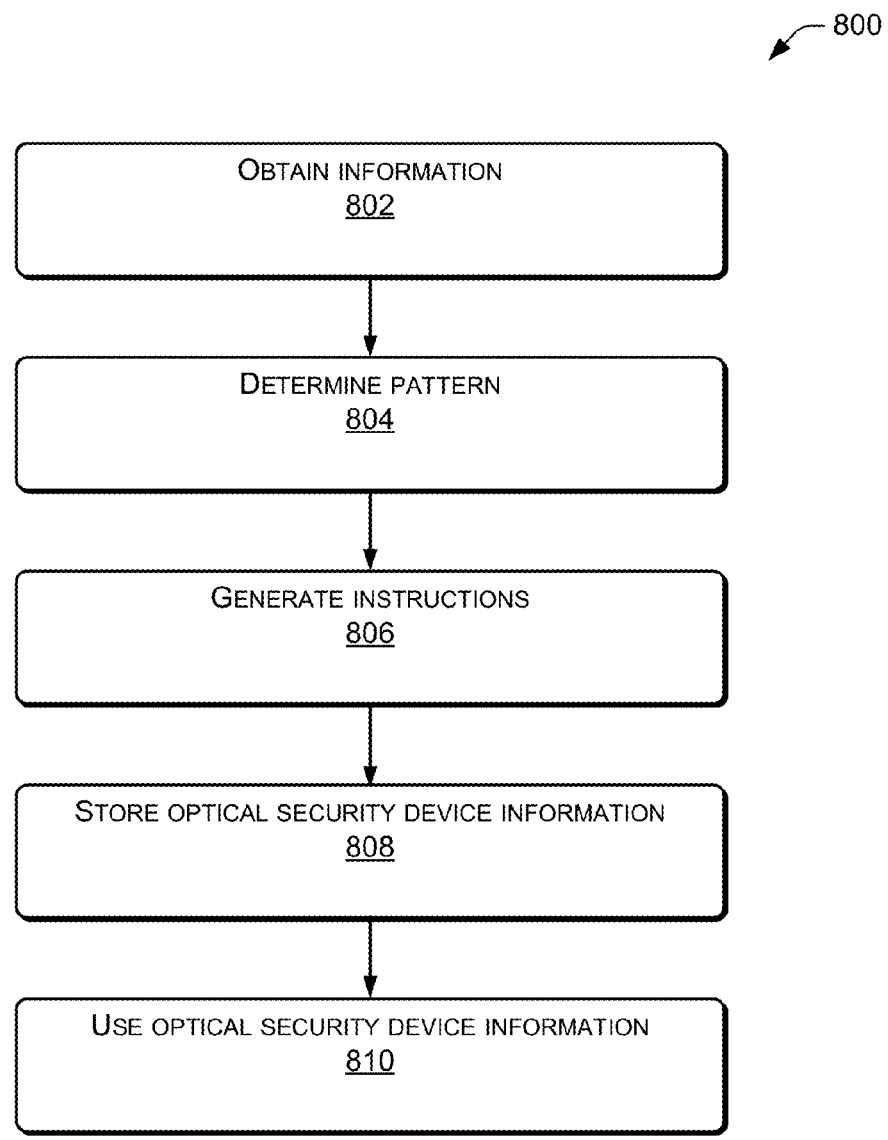
FIG. 8 is a flowchart illustrating an example process of making an optical security device, according to various embodiments.
Figure 9:
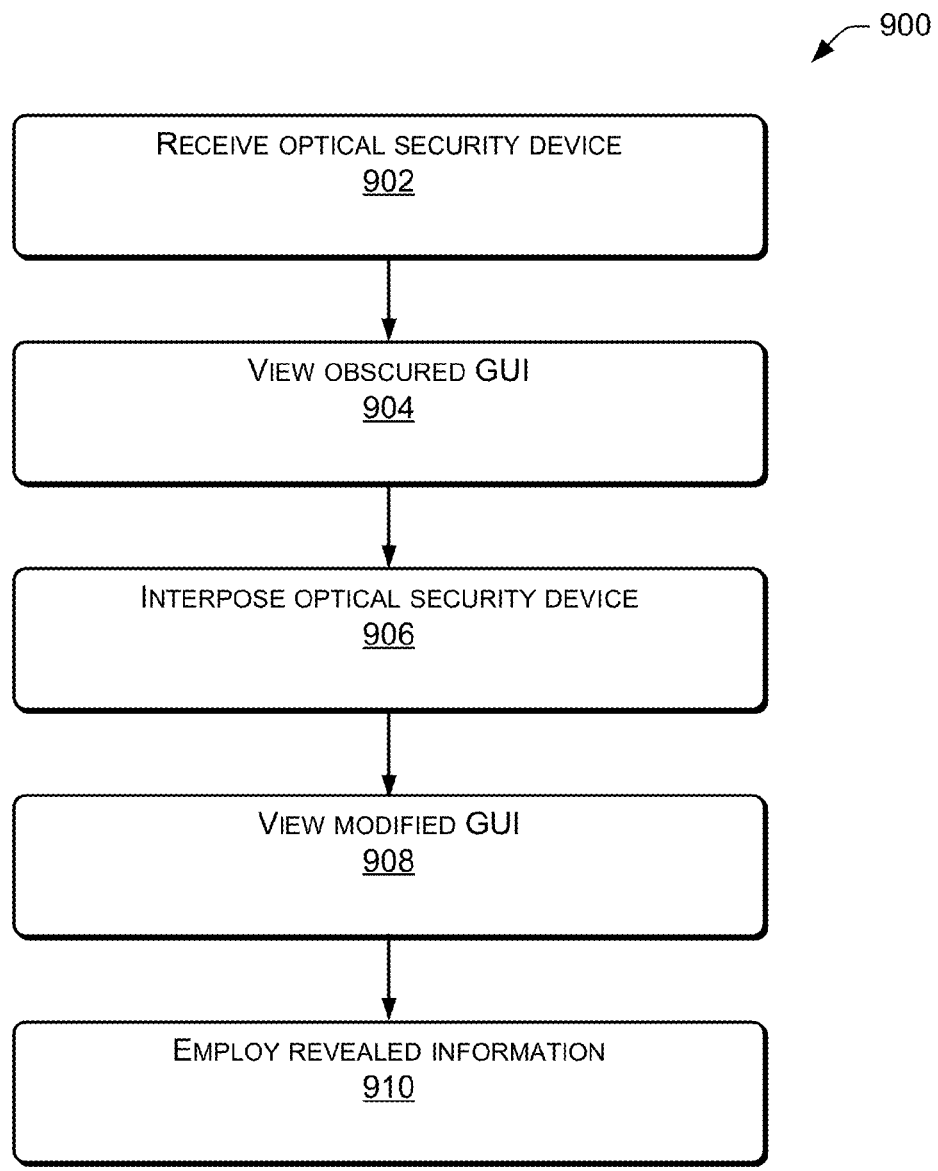
FIG. 9 is a flowchart illustrating an example process of using an optical security device, according to various embodiments.

FIGS. 7, 8, and 9 are flow diagrams depicting example processes for security enhancement. The operations of the example process is illustrated in individual blocks and summarized with reference to those blocks. The process is illustrated as logical flows of blocks, each block of which can represent one or more operations that can be implemented in hardware, software, or a combination thereof. In the context of software, the operations represent computer-executable instructions stored on one or more computer-readable storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described process.

In the example shown in FIG. 7, process 700 includes operations performed by server(s) 106 to generate an obscuring graphical user interface such as graphical user interface 302, 402, and/or 502. In some embodiments an image generator such as image generator 608 generates all or part of the obscuring graphical user interface.

At 702, the server obtains personal information as input such as a user profile, for instance from customer information store 618. For example, if the system is operating for a banking entity, a healthcare entity, a business entity, or a government entity, the input can represent a customer or employee PIN or password. At 704, the server randomizes presentation of the personal information. For example, the server can randomize fonts, sizes, and orientations of characters for presentation in the graphical user interface. As another example, the server can map characters of the PIN or password to different characters, shapes, textures and/or colors using a seed generator such as seed generator 604.

At 706, the server generates at least one background upon which the characters of the PIN or password will be presented. For example, the server can generate a random pattern for a background color of the image to reduce perceivable contrast using the seed generator and an image generator such as image generator 608.

At 708, the server computes an obfuscation pattern to cover at least part of the PIN or password using the seed generator and a key generator such as key generator 606.

At 710, the server provides the background(s) and PIN or password characters in one or more images as a graphical user interface for display by a potentially untrusted device such as device 104 via an interface such as network interface 602.

In the example shown in FIG. 8, process 800 includes operations performed by server(s) 106 to develop an optical security device 132 such as optical security device 132A, 132B, 132C and/or 132D.

At 802, the server obtains information about a graphical user interface and embedded obfuscation pattern with which the optical security device 132 is to be used. In some instances the graphical user interface information will include information about the type of device with which the optical security device 132 will be used such as screen size and resolution as recorded in a user profile, for example from customer information store 618. In some instances the information about the graphical user interface includes an average intensity and/or color spectrum of the graphical user interface from optical security device information store 620.

At 804, the server determines a pattern to work cooperatively with the obfuscation pattern of the graphical user interface to reveal at least part of the PIN or password characters in the graphical user interface using the key generator 606 and the image generator 608.

At 806, the server generates instructions for at least one computer to either print a static type optical security device such as optical security device 132A using printer information 610 and/or to program a dynamic type optical security device such as optical security device 132B, 132C, and/or 132D using dynamic optical security device information 612. In various embodiments, the server employs one or more of a randomizer such as seed generator 604 and/or a key generator 606, an image generator such as image generator 608, printer information, such as printer information 610, and/or dynamic optical security device information such as dynamic optical security device information 612, which in some instances includes instructions for a programmable mask 614 and/or a temporal color filter 616.

At 808, the server stores the optical security device information in a data store such as optical security device store 620.

At 810, in various embodiments, the server can use the optical security device information to manufacture optical security devices, the server can provide the optical security device information to another entity to manufacture optical security devices, and/or, the server can send the optical security device information to one or more particular optical security devices to program the particular optical security device for cooperative use with one or more graphical user interfaces.

In the example shown in FIG. 9, process 900 includes actions taken to employ an optical security device 132 such as optical security device 132A, 132B, 132C and/or 132D.

At 902, a user receives an appropriately configured optical security device such as optical security device 132A, 132B, 132C or 132D configured in accordance with a user profile. In various embodiments, the user receives the optical security device from an entity configured in accordance with the user's profile for the entity via a physical mail service or via personal delivery. In some embodiments personal delivery includes delivery of programming in accordance with the user's profile for the entity to an optical security device that may be configured to contain programming from other entities.

At 904, the user views a graphical user interface that obscures private information via a potentially untrusted device such as device 104.

At 906, the user interposes an optical security device 132 such as optical security device 132A, 132B, 132C and/or 132D between the eye of the user and a display of the device presenting the graphical user interface. In some instances the optical security device 132 can be a static type optical security device such as optical security device 132A, that the user lays upon the display of the device. In other instances, the optical security device 132 can be a dynamic type optical security device such as optical security device 132B, 132C and/or 132D, which the user arranges between their eye and the display of the device. Depending upon the particular dynamic type optical security device being employed, the user may hold or lay the dynamic type optical security device on the display of the device in order to look through a window of the optical security device. Alternately, in some embodiments, the user may look through a window of the optical security device similar to using a magnifying glass. As another option, in some embodiments, the user may look through a window of the of the optical security device configured as a monocle or eye glasses.

At 908, the user views the graphical user interface as modified through the appropriately configured optical security device in order to have at least part of the obscured private information revealed to the user.

At 910, the user employs the revealed private information to access sensitive information such as banking, healthcare, employment, privileged, or other sensitive information.

CONCLUSION

Although the techniques have been described in language specific to structural features and/or methodological acts, it is to be understood that the appended claims are not necessarily limited to the features or acts described. Rather, the features and acts are described as example implementations of such techniques.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a touch enabled display device;
an optical layer configured to be interposed between an eye of a user and the touch enabled display device, wherein:
the optical layer is configured to reveal information presented on the touch enabled display device, the information including a pattern of characters located at random locations on the touch enabled display device for selection via an input; and
at least a portion of the optical layer is configured for use with a first screen resolution of the touch enabled display device and not being configured for use with a second screen resolution of a second display device, the first screen resolution being different than the second screen resolution; and
absent the optical layer, the information is not obtainable.

2. A system as claim 1 recites, the optical layer comprising a foil configured to be laid on a display portion of the touch enabled display device, wherein the input includes touching different locations on the foil to generate at least one of a personal identification number or a password.

3. A system as claim 2 recites, wherein the different locations on the foil correspond to characters from the pattern of characters that define the at least one of the personal identification number or the password.

4. A system as claim 1 recites, the optical layer being configured to narrow a viewing angle so that adversaries cannot glean the information presented on the touch enabled display device via an over the shoulder attack.

5. A system as claim 1 recites, the optical layer being configured particularly for use by the user to access private information particular to the user and not by a second user.

6. A system as claim 1 recites, wherein the first screen resolution is defined by a user profile of a user to which the optical layer is provided.

7. A system as claim 1 recites, further configured such that the pattern of characters is located on the optical layer such that the optical layer can attach to the touch enabled display device in four different orientations.

8. A user interface comprising:
a touch enabled display; and
concealed information presented via the touch enabled display controlled by a processor,
the concealed information being viewable as information when an optical layer is held over the touch enabled display, at least a portion of the optical layer is configured for use with a first screen resolution of a touch enabled display device and not being configured for use with a second screen resolution of a second display device, the first screen resolution being different than the second screen resolution,
the information including a pattern of characters located at random locations on the touch enabled display for selection via an input to access private information,
the pattern of characters comprising at least one alpha-numeric character that is a larger size or a different font than at least one other alpha-numeric character, wherein the at least one alpha-numeric character and the at least one other alpha-numeric character are selectable to access the private information.

9. A user interface as claim 8 recites, the pattern of characters comprising a keyboard that includes keys presented at the random locations on the touch enabled display.

10. A user interface as claim 8 recites, the pattern of characters comprising a numeric keypad that includes alpha-numeric characters presented at the random locations on the touch enabled display.

11. A user interface as claim 8 recites, the optical layer comprising a foil configured to be laid on the touch enabled display, wherein the input includes touching different locations on the foil to generate at least one of a personal identification number or a password.

12. A user interface as claim 11 recites, wherein the different locations on the foil correspond to characters from the pattern of characters that define the at least one of the personal identification number or the password.

13. A method comprising:
receiving a user profile;
configuring an optical security device based at least on the received user profile to reveal information presented on a touch enabled display device when the optical security device is interposed between an eye of a user and the touch enabled display device, the information including a pattern of characters located at random locations on the touch enabled display device for selection via an input, the information being unobtainable absent the optical security device, at least a portion of the optical security device being configured for use with a first screen resolution of the touch enabled display device and not being configured for use with a second screen resolution of a second display device, the first screen resolution being different than the second screen resolution; and
sending the optical security device toward the user.

14. A method as claim 13 recites, the optical security device comprising a foil configured to be laid on a display portion of the touch enabled display device, wherein the input includes touching different locations on the foil to generate at least one of a personal identification number or a password.

15. A method as claim 14 recites, wherein the different locations on the foil correspond to characters from the pattern of characters that define the at least one of the personal identification number or the password.

16. A method as claim 13 recites, the configuring comprising printing the pattern of characters on the optical security device.

17. A method as claim 13 recites further comprising pairing the optical security device to the user such that the optical security device is configured particularly for use by the user corresponding to the user profile to access private information particular to the user and not by a second user.

18. A method as claim 13 recites further comprising generating the optical security device using a computer that is programmed to generate the optical security device.

19. A method as claim 13 recites further comprising printing the optical security device using a printer arranged to print the pattern of characters on the optical security device.

20. A method as claim 13 recites, wherein the first screen resolution is defined by the user profile.

* * * * *